(12) United States Patent
Furukawa

(10) Patent No.: US 8,468,399 B2
(45) Date of Patent: Jun. 18, 2013

(54) CACHE LOGIC VERIFICATION APPARATUS AND CACHE LOGIC VERIFICATION METHOD

(75) Inventor: Eiji Furukawa, Kawasaki (JP)

(73) Assignee: Fujitsu Limited, Kawakasi (JP)

( * ) Notice: Subject to any disclaimer, the term of this patent is extended or adjusted under 35 U.S.C. 154(b) by 744 days.

(21) Appl. No.: 12/550,741

(22) Filed: Aug. 31, 2009

(65) Prior Publication Data

US 2010/0057996 A1 Mar. 4, 2010

(30) Foreign Application Priority Data

Sep. 4, 2008 (JP) ................................. 2008-227517

(51) Int. Cl.
*G11C 29/00* (2006.01)
*G06F 13/00* (2006.01)

(52) U.S. Cl.
USPC .......................................... 714/718; 711/141

(58) Field of Classification Search
USPC ................... 714/718, 763; 711/141
See application file for complete search history.

(56) References Cited

U.S. PATENT DOCUMENTS

| | | | | |
|---|---|---|---|---|
| 5,749,089 A | * | 5/1998 | Yoshizawa et al. | 711/127 |
| 5,822,760 A | * | 10/1998 | Yoshizawa et al. | 711/137 |
| 6,003,116 A | * | 12/1999 | Morita et al. | 711/141 |
| 6,012,085 A | * | 1/2000 | Yohe et al. | 709/217 |
| 6,092,159 A | * | 7/2000 | Ekner et al. | 711/152 |
| 6,202,127 B1 | | 3/2001 | Dean | |
| 6,775,740 B1 | * | 8/2004 | Nishiyama | 711/118 |
| 6,968,427 B1 | * | 11/2005 | Yee | 711/118 |
| 7,337,200 B2 | * | 2/2008 | Ishikawa et al. | 1/1 |
| 7,437,692 B2 | * | 10/2008 | Oberlaender | 716/138 |
| 7,475,169 B2 | * | 1/2009 | Yuhara et al. | 710/38 |
| 7,506,099 B2 | * | 3/2009 | Iwanari et al. | 711/104 |
| 7,653,831 B2 | * | 1/2010 | Okamoto et al. | 714/6.12 |
| 7,818,502 B2 | * | 10/2010 | Kurokawa | 711/128 |
| 7,849,258 B2 | * | 12/2010 | Sato et al. | 711/112 |
| 2002/0004889 A1 | * | 1/2002 | Honma et al. | 711/154 |
| 2008/0195837 A1 | * | 8/2008 | Ishii et al. | 711/200 |
| 2009/0125562 A1 | * | 5/2009 | Katayama et al. | 707/200 |

FOREIGN PATENT DOCUMENTS

| | | |
|---|---|---|
| JP | 03-129440 | 6/1991 |
| JP | 05-224995 | 9/1993 |
| JP | 11-328019 | 11/1999 |
| JP | 2001-256270 | 9/2001 |
| JP | 2001-306397 | 11/2001 |
| JP | 2002-312416 | 10/2002 |

OTHER PUBLICATIONS

Notice of Reasons for Refusal dated Dec. 25, 2012, for corresponding Japanese Application No. 2008-227517.

* cited by examiner

*Primary Examiner* — James C Kerveros

(74) *Attorney, Agent, or Firm* — Staas & Halsey LLP

(57) ABSTRACT

A cache logic verification apparatus includes an acquisition unit that acquires an ongoing process in each stage of a stepped operation to judge whether data to be read in a cache memory holding a copy of contents of a part of a memory is held or not, and a comparator that compares the ongoing process in each stage acquired by the acquisition unit with a scheduled ongoing process predetermined in each stage of the stepped operation.

9 Claims, 15 Drawing Sheets

CACHE LOGIC VERIFICATION APPARATUS AND CACHE LOGIC VERIFICATION METHOD

CROSS-REFERENCE TO RELATED APPLICATIONS

This application is based upon and claims the benefit of priority of the prior Japanese Patent Application No. 2008-227517, filed on Sep. 4, 2008, the entire contents of which are incorporated herein by reference.

FIELD

An embodiment of the present invention discussed herein relates to a cache logic verification apparatus and a cache logic verification method.

BACKGROUND

In a computer system, a cache memory capable of high-speed read/write operation is used to fill the speed gap between a central processing unit (CPU) and a main memory.

The cache memory holds a part of the data stored in the main memory. The set-associative memory is an example of the cache memory. The cache memory includes a tag RAM for holding the address (tag) indicating the storage position of the cache data on the main memory and a data RAM for holding cache data. The tag RAM and the data RAM have such a data structure that a plurality of cache lines correspond to each of the blocks into which the main memory is divided and have as many parallel ways as the cache lines. At the time of accessing the data, the same block covering the ways is generally accessed.

In designing the cache memory, the legitimacy of the logic design is verified by various methods in the logic design stage of the cache.

For example, a verification device emulating a cache memory receives a memory access request of the computer in operation is known. The verification device verifies the operation logic by emulating the memory access operation.

In another known technique, the result of execution of a plurality of instructions for each machine cycle by a verification device emulating a pipelined cache memory according a logic verification program is compared with the result of executing one instruction at a time by a verification unit emulating a cache memory for sequentially executing one instruction at a time, i.e. an expectation value thereby to verify the legitimacy of the contents held in the verification device.

Examples of the references disclosing the techniques for the cache memory include Japanese Unexamined Patent Publications Nos. 2001-306397 and 2001-256270.

The conventional method of logic verification of the cache memory poses the problem that the legitimacy of the logic design of the cache memory cannot be efficiently verified. Specifically, when the data is read from the cache memory, the process is executed in stages to judge whether the data is held in the cache memory or not, and therefore, which one of a plurality of stages of the reading process is erroneous cannot be efficiently verified. In order to positively verify which stage is erroneous, the main memory and the cache memory are required to be prepared for each stage to clarify whether the operation in each stage is correct or erroneous. This measure, however, complicates the logic verification and requires many verification steps.

SUMMARY

According to an aspect of the invention, the cache logic verification apparatus includes an acquisition unit that acquires an ongoing process in each stage of a stepped operation to judge whether data to be read in a cache memory holding a copy of contents of a part of a memory is held or not; and a comparator that compares the ongoing process in each stage acquired by the acquisition unit with a scheduled ongoing process predetermined in each stage of the stepped operation.

DESCRIPTION OF EMBODIMENTS

The information processing apparatus having a cache logic verification apparatus according to an embodiment is explained in detail below with reference to the drawings. Incidentally, this invention is not limited to this embodiment.

Figure 1:
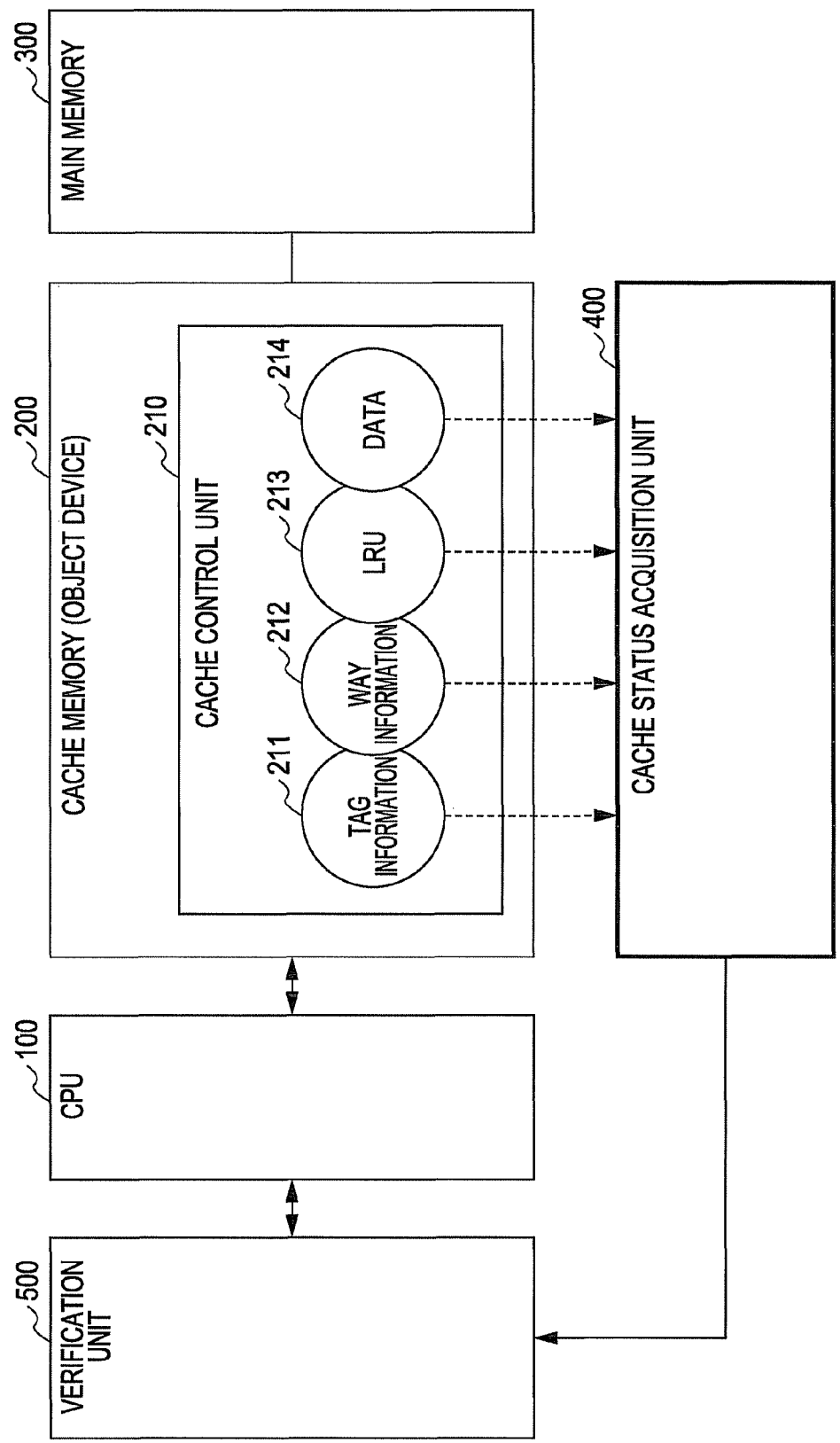
FIG. 1 illustrates an information processing apparatus according to an embodiment.

FIG. 1 illustrates the information processing apparatus according to a first embodiment of the invention. As illustrated in FIG. 1, the information processing apparatus includes a CPU 100, a cache memory 200, a main memory 300, a cache status acquisition unit 400 and a verification unit 500 making up a part of the cache logic verification apparatus.

Upon reception of a verification command from the verification unit 500, the CPU 100 interprets the received verification command and instructs the cache memory 200 to execute the read operation. The verification command is a command for verifying the logic operation of the cache memory 200, for example, by reading the data held in the cache memory 200. Also, the CPU 100 acquires the data read from the cache memory 200 and outputs the acquired data to the verification unit 500.

The cache memory 200 is a device constituting an object for which the logic verification is carried out by the cache logic verification apparatus. The cache memory 200 includes a cache control unit 210.

The cache memory 200 holds the frequently used data held on the main memory 300, while at the same time holding the tag indicating the address on the main memory 300, of the data held in the cache memory 200. According to this embodiment, the cache memory 200 is assumed to employ the two-way set associative configuration in which two cache lines correspond to each memory block of the main memory 300. In the description that follows, each cache line corresponding to the same memory block is called "the way". Although this embodiment employs the two-way cache memory 200, the invention is not limited to this configuration and may have four or eight ways.

In the cache control unit 210, the data is read from the cache memory in response to a read command from the CPU 100, and the data read from the cache memory is outputted to the CPU 100. Also, in the cache control unit 210, the progress information acquired by the stepped operation during the period before the CPU 100 reads the data from the read command is outputted to the cache status acquisition unit 400. According to this embodiment, the progress information is, for example, tag information 211, way information 212, LRU 213 and data 214. Each progress information is explained below.

In response to the read command from the CPU 100, the cache control unit 210 reads the tag information 211 corresponding to the verification address at which the data is stored beforehand in the main memory 300. The tag information 211 is the progress information acquired by the cache control unit 210 reading the tag from the area where the tag corresponding to the verification address is held. The tag information 211 read by the cache control unit 210 contains two tags for each way corresponding to the same memory block as the verification address, and the address of different data exists for each way.

The cache control unit 210 judges whether the verification address is contained in the tag for each way in the tag information 211, after reading the tag information 211 corresponding to the verification address from the cache memory 200. Specifically, the cache control unit 210 acquires the data indicating a cache hit in the case where the verification address is contained in the tag of the way in the tag information 211. In the case where the verification address is not contained in the tag of the way, on the other hand, the cache control unit 210 acquires the data indicating a cache miss. The way information 212 is the progress information acquired by judging whether the verification address is contained in the tag for each way in the tag information 211.

The cache control unit 210 selects the way of the tag containing the verification address, in accordance with the result of judgment whether the verification address is contained in the tag for each way in the tag information 211. In the case where the verification address is not contained in the tag of any way, the cache control unit 210 selects the least recently used way from the tag information 211 by LRU (Least Recently Used) control, and replaces the address held in the tag of the selected way with the verification address. The LRU 213 is the progress information acquired by selecting the way of the tag already containing the verification address or the tag to contain the verification address.

The cache control unit 210 judges whether the verification address is contained in the tag for each way in the tag information 211. The cache control unit 210 reads the data corresponding to the tag from the cache memory 200, upon judgment that the verification address is contained in the tag of one of the ways. On the other hand, upon judgment that the tag is not contained in the way of either tag, the cache control unit 210 reads the data read from the main memory 300 and replaced by LRU control. The data 214 is the progress information acquired by the cache control unit 210 reading the data corresponding to the tag indicating the verification address.

The main memory 300 is a main storage unit for storing the data and the program required for the process executed by the CPU 100. In the main memory 300, the data is written beforehand in the verification address in order that the cache logic verification apparatus may carry out the logic verification of the cache memory 200. Incidentally, the main memory 300, though larger in capacity than the cache memory 200, is lower in access rate.

The cache status acquisition unit 400 acquires the progress information acquired by the operation performed in stages by the cache control unit 210 at the time of reading the data. Specifically, the cache status acquisition unit 400 acquires the tag information 211, the way information 212, the LRU 213 and the data 214 output in the order of the operation performed in stages by the cache control unit 210. Also, the cache status acquisition unit 400, once a series of progress information before reading the data corresponding to the verification address is ready, shapes the series of the progress information into the same form as the expectation value described later, and outputs the shaped data as output data to the verification unit 500. Incidentally, the cache status acquisition unit 400 may acquire the progress information using, for example, the Verilog language adapted to describe the assertion. The assertion is defined as a check point acquired to confirm the correctness or error of the logic design of the cache control unit 210 by acquiring each progress information acquired in the operation performed in stages at the time of reading the data.

In order to start the logic verification of the cache memory 200, the verification unit 500 outputs the verification command for the cache memory 200 to the CPU 100. Also, the verification unit 500 acquires, from the CPU 100, the data read by the CPU 100 from the cache memory 200 in accordance with a verification command. Further, the verification unit 500 acquires the output data from the cache status acquisition unit 400. Then, the verification unit 500 compares the output data acquired from the cache status acquisition unit 400 with the expectation value of the output data. The expectation value of the output data is defined as a value of the progress information intended by the verifier at the time of reading the data in accordance with the verification command and held in the verification unit 500 in advance. In the case where the output data of the series of the progress information coincide entirely with the expectation value of the output data, the verification unit 500 outputs the information indicating that the operation of the cache control unit is normal. In the case where the output data of the series of the progress information fails to coincide with at least a part of the expectation value of the output data, on the other hand, the verification unit 500 outputs the information indicating the operation corresponding to the progress information that fails to coincide. As a result, the verification unit 500 can collectively verify the progress information acquired by the operation performed in stages before reading the data of the verification address.

Figure 2:
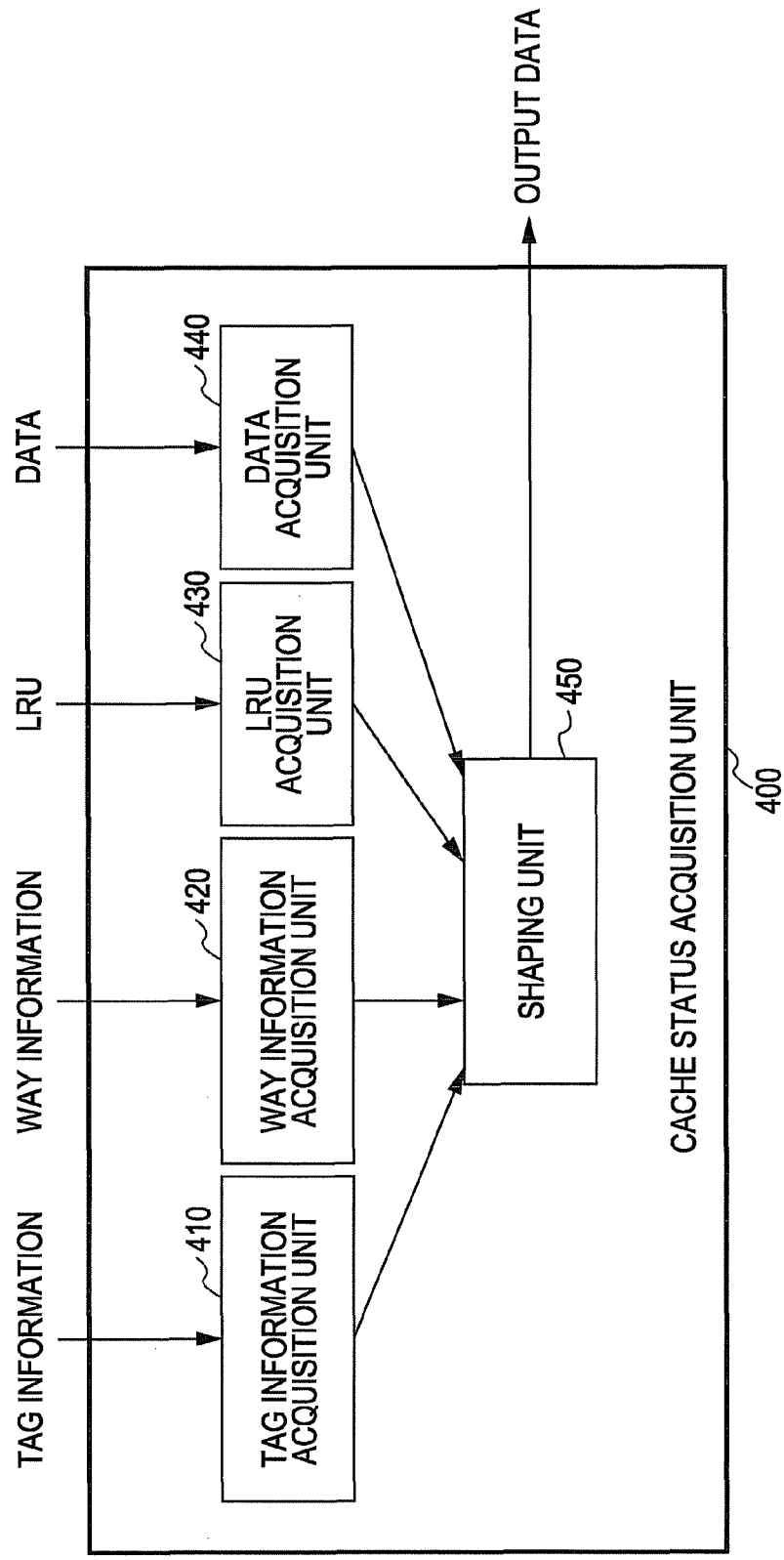
FIG. 2 illustrates a cache status acquisition unit according to a first embodiment.

FIG. 2 illustrates the configuration of the cache status acquisition unit 400 according to the first embodiment. As illustrated in FIG. 2, the cache status acquisition unit 400 includes a tag information acquisition unit 410, a way information acquisition unit 420, an LRU acquisition unit 430, a data acquisition unit 440 and a shaping unit 450.

The tag information acquisition unit 410 acquires the tag information 211 corresponding to the verification address read by the cache control unit 210, and outputs the acquired tag information 211 to the shaping unit 450. The tag information 211 contains the tags of two ways.

The way information acquisition unit 420 acquires, as the way information 212 for each way, the result of judgment made by the cache control unit 210 as to whether the verification address is contained in the tag for each way or not, and outputs the acquired judgment result to the shaping unit 450.

The LRU acquisition unit 430 acquires, as the LRU 213, the way of the tag containing the verification address acquired by the cache control unit 200 and outputs the acquired way to the shaping unit 450.

The data acquisition unit 440 acquires the data 214 corresponding to the verification address read by the cache control unit 210, and outputs the acquired data 214 to the shaping unit 450.

The shaping unit 450, holds the acquired tag information 211 upon acquisition of the tag information 211 from the tag acquisition unit 410. Also, the shaping unit 450 holds the acquired way information 212, upon acquisition of the way information 212 from the way information acquisition unit 420. Further, the shaping unit 450 holds the acquired LRU 213, upon acquisition of the LRU 213 from the LRU acquisition unit 430. Also, the shaping unit 450 holds the acquired data 214 upon acquisition of the data 214 from the data acquisition unit 440. Further, in the shaping unit 450, at the time of acquiring the data 214 from the data acquisition unit 440, each progress information thus held is coupled in the same order as the expectation value of the series of the progress information held by the verification unit 500 in advance, and the coupled output data are collectively outputted to the verification unit 500. Incidentally, as an example of the shaping unit 450 to output the output data to the verification unit 500, the output data is output to one file, and the outputted file is read by the verification unit 500, so that the verification unit 500 may acquire the output data.

Figure 3:
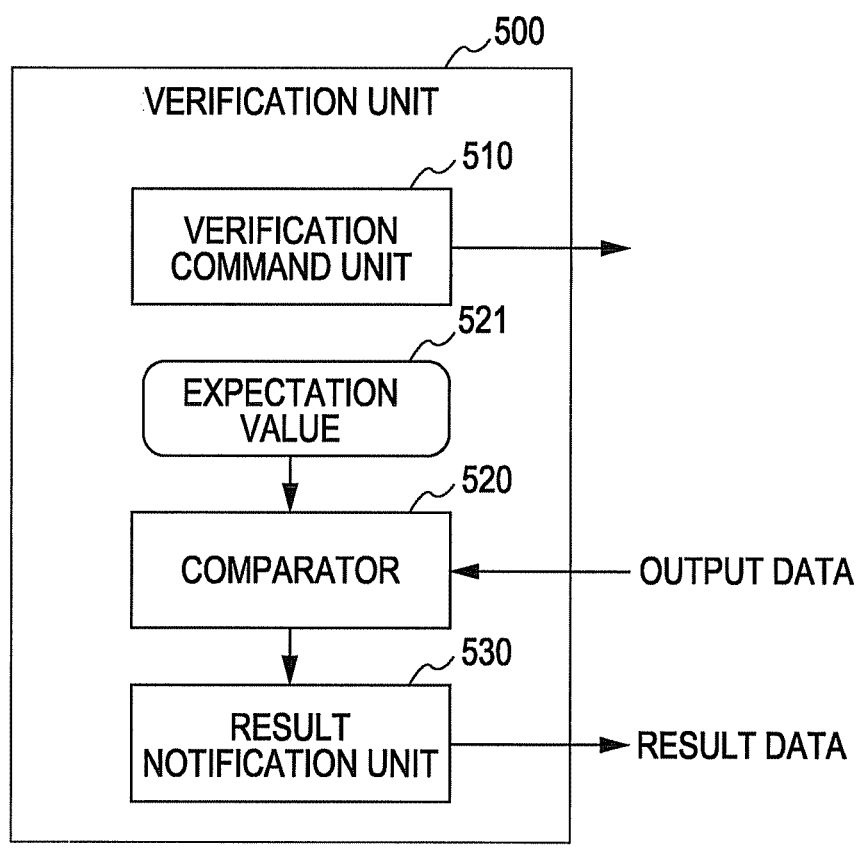
FIG. 3 illustrates a verification unit according to the first embodiment.

FIG. 3 illustrates the configuration of the verification unit according to the first embodiment. As illustrated in FIG. 3, the verification unit 500 includes a verification command unit 510, a comparator 520, an expectation value 521 and a result notification unit 530.

The verification command unit 510 outputs a command to the CPU 100 to verify the cache memory 200.

The comparator 520 compares the acquired output data with the expectation value 521 of the series of the progress information held in advance, upon acquisition of the output data from the shaping unit 450. As long as the acquired output data coincides with the expectation value 521, the result notification indicating the coincidence is output by the comparator 520 to the result notification unit 530. On the other hand, the comparator 520 outputs the result notification containing the operation corresponding to the incoincident progress information to the result notification unit 530, in the case where the acquired output data fails to coincide with the expectation value 521.

The expectation value 521 represents a series of the progress information held for each verification scenario of the cache memory 200 and expected to be acquired by the operation performed in stages at the time of reading the data of the verification address. For example, the expectation value 521 indicates the tag information 211, the way information 212, the LRU 213 and the data 214 for reading the data of the verification address.

The result notification unit 530 outputs the acquired result to a monitor for example, upon acquisition of the result notification from the comparator 520.

The operation of cache status acquisition according to the first embodiment is explained with reference to FIGS. 4 and 5.

Figure 4:
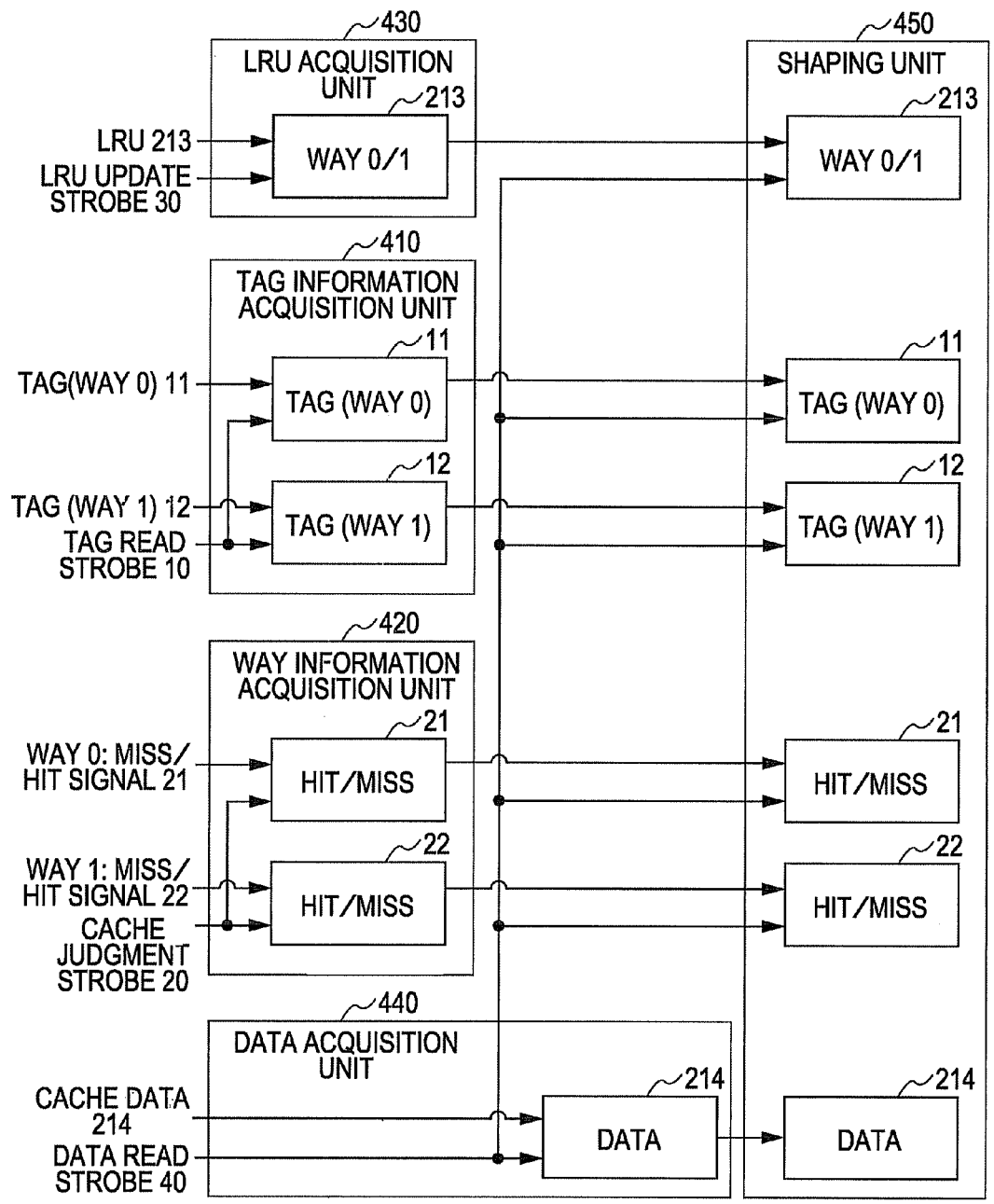
FIG. 4 illustrates an operation for acquiring the cache status according to the first embodiment.

In FIG. 4 the operation of cache status acquisition is explained with reference to the cache status acquisition unit 400. In FIG. 5, the operation of cache status acquisition is explained with reference to the progress information acquired in time series by the cache status acquisition unit 400.

FIG. 4 illustrates the operation of the cache status acquisition unit 400. As illustrated in FIG. 4, the tag information acquisition unit 410, the way information acquisition unit 420, the LRU acquisition unit 430 and the data acquisition unit 440 monitor the strobes output from the cache control unit 210, respectively. Upon acquisition of the strobe, the tag information acquisition unit 410 acquires the information corresponding to each strobe and outputs the acquired information to the shaping unit 450.

Upon acquisition of an LRU update strobe 30 providing a trigger for the output of the LRU 213 constituting the progress information from the cache control unit 210, the LRU acquisition unit 430 acquires the LRU 213 and outputs the acquired LRU 213 to the shaping unit 450. Upon acquisition of the tag read strobe 10 providing a trigger for the output of the tag information 211 constituting the progress information from the cache control unit 210, the tag information acquisition unit 410 acquires the tag 11 of the way 0 and the tag 12 of the way 1 contained in the tag information 211, and outputs the acquired tags 11 and 12 to the shaping unit 450. On the other hand, the way information acquisition unit 420 acquires the information 21, 22 indicating that the tag for each way is a cache hit and a cache miss, respectively, upon acquisition of the cache judgment strobe 20 providing a trigger for the output of the way information 212 constituting the progress information from the cache control unit 210, and outputs the acquired information 21, 22 to the shaping unit 450. Upon acquisition of the data read strobe 40 providing a trigger for the output of the data 214 constituting the progress information from the cache control unit 210, the data acquisition unit 440 acquires the cache data 214 and outputs the acquired cache data 214 to the shaping unit 450. In the process, the data acquisition unit 440 that has acquired the data read strobe 40 outputs an output command to the shaping unit 450.

The shaping unit 450 that has acquired the output command shapes the progress information (11, 12, 21, 22, 213, 214) outputted from the tag information acquisition unit 410, the way information acquisition unit 420, the LRU acquisition unit 430 and the data acquisition unit 440 as output data, respectively, and outputs the output data collectively to the verification unit 500.

Figure 5:
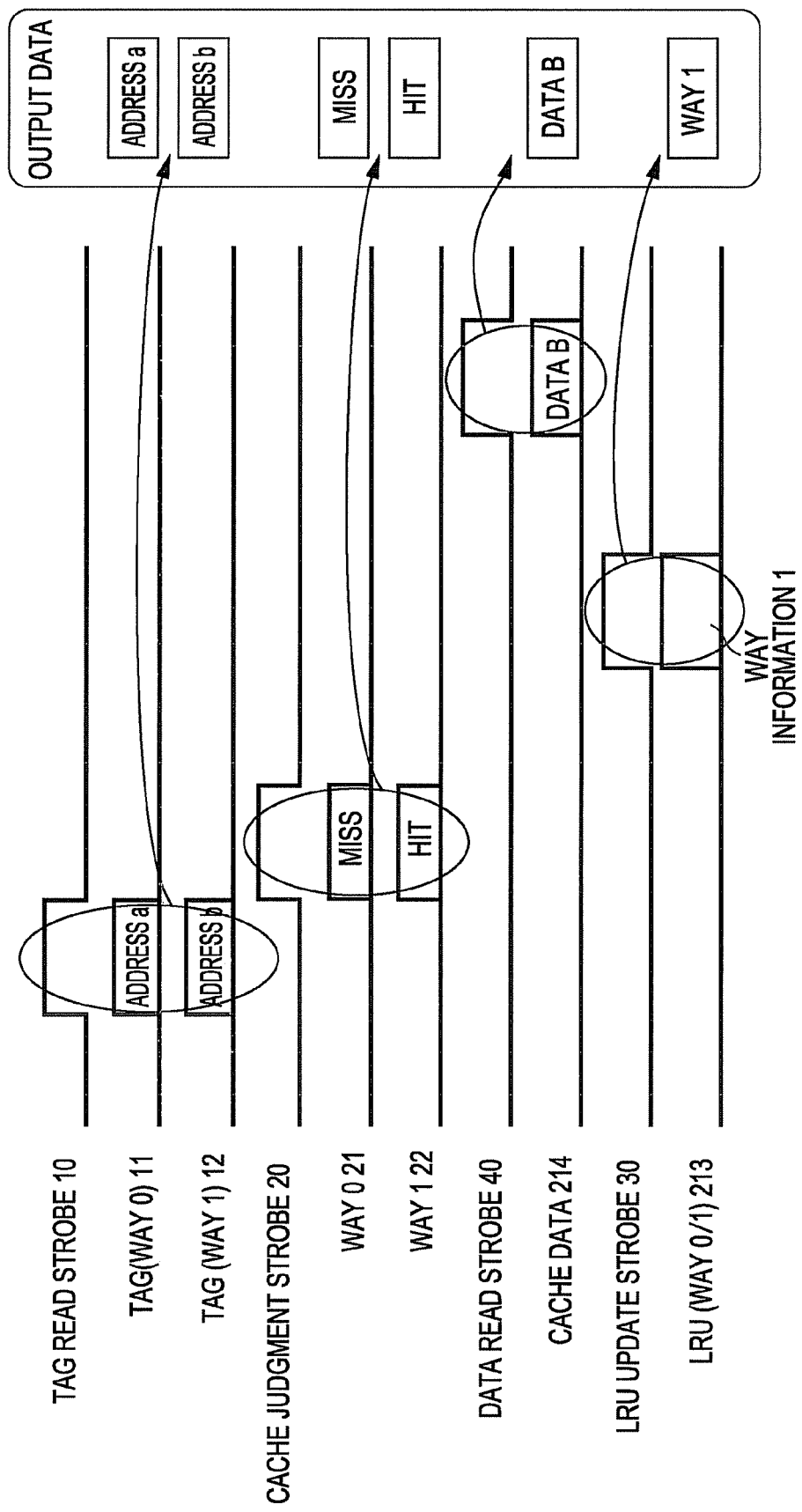
FIG. 5 illustrates an operation for acquiring the cache status according to the first embodiment.

FIG. 5 illustrates the status in which the cache status acquisition unit 400 acquires the progress information in time series. FIG. 5 illustrates the manner in which each progress information outputted from the cache control unit 210 is acquired by the cache status acquisition unit 400 in time series. Incidentally, the cache control unit 210 outputs the progress information, the tag information 211, the way information 212, the LRU 213 and the data 214 acquired in order of the operation performed in stages.

Upon acquisition of the tag read strobe 10, the cache status acquisition unit 400 acquires the tag 11 of the way 0. In the case of FIG. 5, the tag 11 of the way 0 indicates the address a. Also, the cache status acquisition unit 400 acquires the tag 12 of the way 1 at the same time upon acquisition of the tag 11 of the way 0. In FIG. 5, the tag 12 of the way 1 indicates the address b.

The cache status acquisition unit 400 then acquires the information 21 indicating that the tag of the way 0 is a cache hit or a cache miss, upon acquisition of the cache judgment strobe 20. In the case of FIG. 5, the information 21 indicates that the tag of the way 0 is a cache miss. Also, at the same time as the information 21 of the way 0, the cache status acquisition unit 400 acquires the information 22 indicating that the tag of the way 1 is a cache hit or a cache miss. In FIG. 5, the information 22 is the one indicating that the tag of the way 1 is a cache miss.

Then, the cache status acquisition unit 400 acquires the LRU 213, upon acquisition of the LRU update strobe 30. In FIG. 5, the LRU 213 represents the way 1 of which the tag is a cache hit.

Further, the cache status acquisition unit 400 acquires the cache data 214, upon acquisition of the data read strobe 40. In FIG. 5, the cache data 214 represents the data B.

A collection of the data indicated by each signal, the address a, the address b, the cache hit, the cache miss, the data B and the way 1 make up the output data. This output data is outputted to the verification unit 500, and compared with the expectation value 521 of a series of the progress information held beforehand in the verification unit 500.

Figure 6:
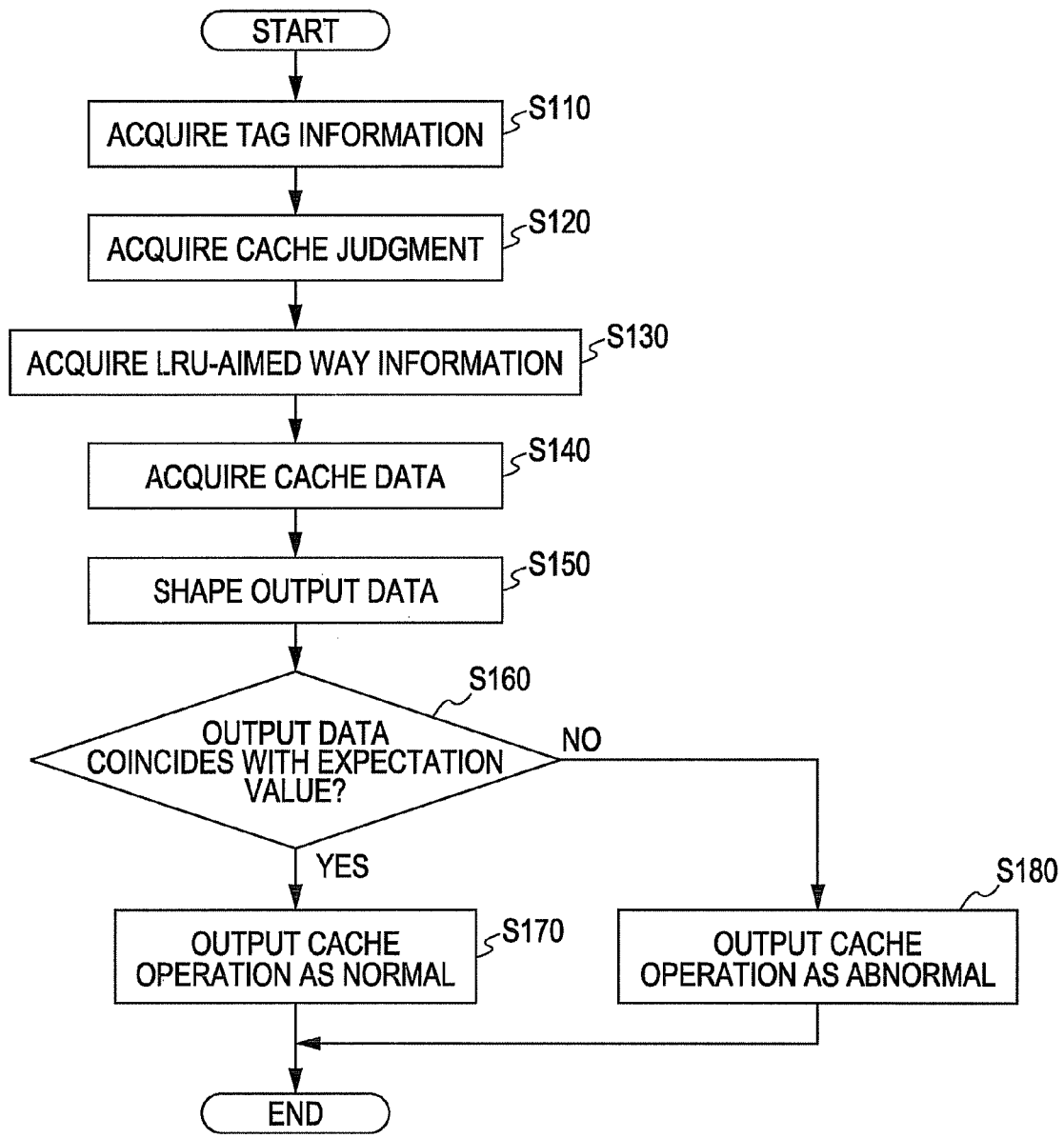
FIG. 6 is a flowchart illustrating a process of cache memory verification according to the first embodiment.

The process executed in the cache memory verification method according to the first embodiment is explained with reference to FIG. 6. FIG. 6 is a flowchart illustrating the process of the cache memory verification method according to the first embodiment.

Upon reception of a command from the CPU 100 to read the data of the verification address, the cache control unit 210 reads the tag information 211 corresponding to the verification address, and outputs the tag information 211 thus read to the cache status acquisition unit 400. The tag information 211 contains the tags of two ways corresponding to the same memory block as the verification address. The tag information acquisition unit 410 outputs it to the shaping unit 450, upon acquisition of the tag information 211 output by the cache control unit 210 (S110).

Next, the cache control unit 210 that has read the tag information 211 corresponding to the verification address judges whether the verification address is contained in the tag for each way in the tag information 211, and outputs the way information 212 as a judgment result for each way to the cache status acquisition unit 400. The way acquisition unit 420 acquires the way information 212 output from the cache control unit 210 as a cache judgment (S120), and outputs the way information 212 to the shaping unit 450.

Next, in accordance with the judgment as to whether the verification address is contained in the tag for each way, the cache control unit 210 acquires the way of the tag already containing the verification address or the way of the tag coming to contain the verification address, and outputs the LRU 213 indicating the acquired way to the cache status acquisition unit 400. The LRU acquisition unit 430 acquires the LRU 213 output from the cache control unit 210 (S130) and outputs the LRU 213 to the shaping unit 450.

Further, in accordance with the judgment as to whether the verification address is contained in the tag for each way and in the case where the verification address is contained in the tag of one of the ways, the cache control unit 210 reads the data corresponding to the tag containing the verification address. On the other hand, in the case where the verification address is contained in the tag of neither way, the cache control unit 210 reads the data that has been read from the main memory 300. Then, the cache control unit 210 outputs the data 214 thus read to the cache status acquisition unit 400. The data acquisition unit 440 acquires the data 214 output from the cache control unit 210 (S140) and outputs the data 214 to the shaping unit 450.

The shaping unit 450 that has acquired the data 214 from the data acquisition unit 440 shapes the output data using the tag information 211 acquired from the tag information acquisition unit 410, the way information 212 acquired from the way information acquisition unit 420, the LRU 213 acquired from the LRU acquisition unit 430 and the data 214 acquired from the data acquisition unit 440 (S150). In the process, the shaping unit 450 shapes the output data into the same form as the expectation value 521 held in advance.

Then, the comparator 520 judges whether the shaped output data coincides with the expectation value held in advance or not (S160).

In the case where the shaped output data coincides with the expectation value (YES in S160), the comparator 520 outputs the result notification indicating the coincidence to the result notification unit 530. The result notification unit 530 outputs the result information indicating that the operation of the cache memory is normal (S170).

On the other hand, in the case where the shaped output data fails to coincide with the expectation value (NO in S160), the comparator 520 outputs the result notification containing the operation on the incoincident progress information to the result notification unit 530. The result notification unit 530 outputs the result information indicating that the operation of the cache memory is abnormal, together with the result notification containing the operation of the incoincident progress information (S180).

Figure 7:
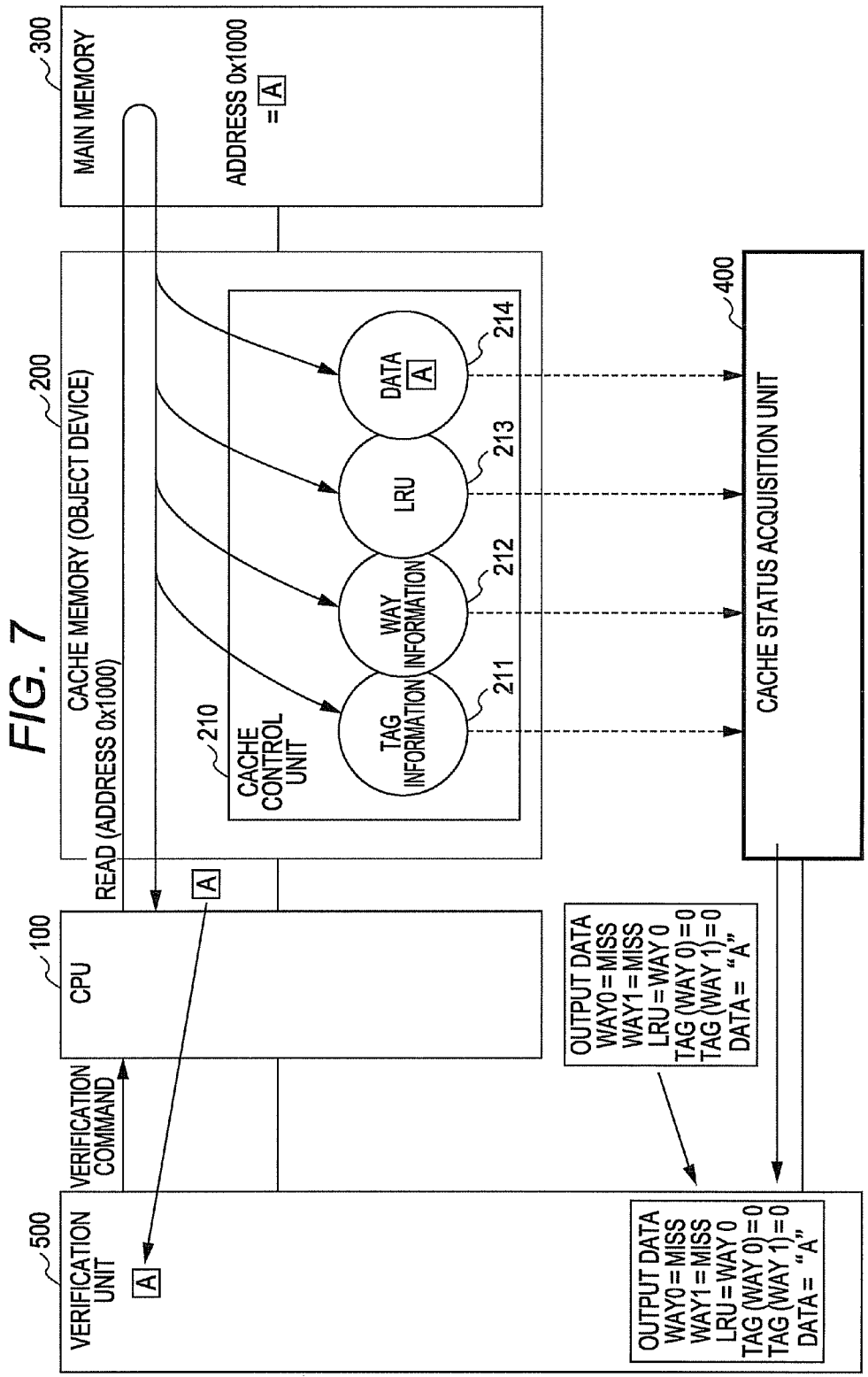
FIG. 7 illustrates an operation for verifying the cache memory according to the first embodiment.
Figure 8:
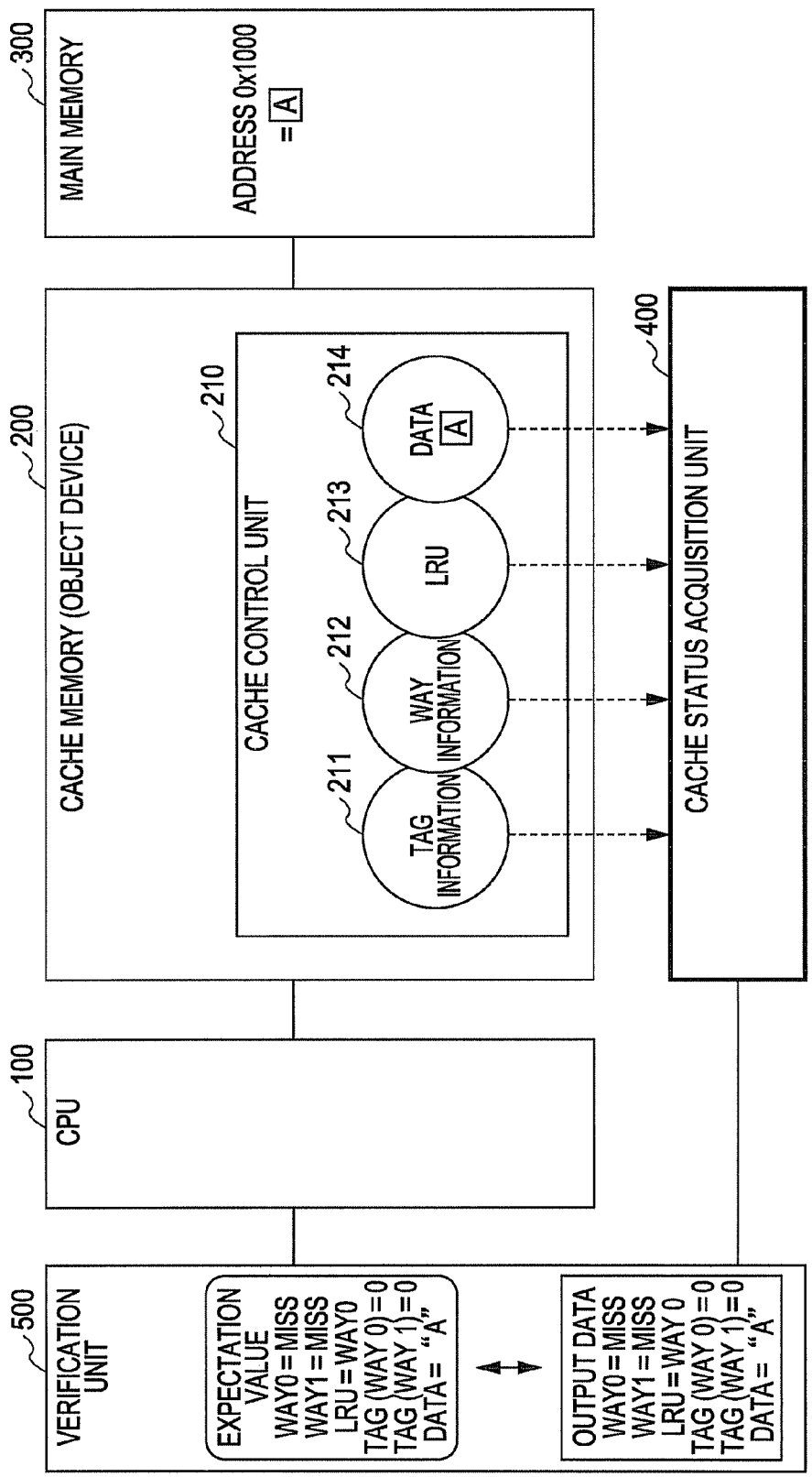
FIG. 8 illustrates an operation for verifying the cache memory according to the first embodiment.

Next, the verification operation with the data held in the cache memory 200 is explained with reference to FIGS. 7 and 8. The case in which the data is held in the cache memory 200 is explained with reference to FIG. 7, and the case in which the progress information is verified with the data held in the cache memory 200 is explained with reference to FIG. 8. Incidentally, it is assumed that the data of the verification address is not held in the cache control unit 210 and no information is held in the tag for each way corresponding to the verification address.

The case in which the data is held in the cache memory 200 is explained with reference to FIG. 7. As illustrated in FIG. 7, the CPU 100 that has acquired the verification command from the verification unit 500 issues a read command to the cache control unit 210 to read the data of the verification address (address 0x1000) of the main memory 300. In the case of FIG. 7, the data of the verification address of the main memory 300 is not held in the cache memory 200, and therefore, the cache control unit 210 reads the data of the verification address from the main memory 300 and holds the data thus read in the cache memory 200.

In the process, the cache control unit 210 outputs the progress information acquired by the operation performed in stages before reading the data in response to the read command, to the cache status acquisition unit 400. The cache control unit 210 reads the tag for each way corresponding to the verification address. In the case of FIG. 7, no information is held in the tag for each way corresponding to the verification address. Therefore, the cache control unit 210 acquires the tag information 211 indicating that the tags of both the ways 0 and 1 are "0" and outputs it to the cache status acquisition unit 400. Also, the cache control unit 210 judges whether the verification address is contained in the tag for each way. In the case where the verification address is not contained in the tag for each way corresponding to the verification address, the cache control unit 210 acquires the way information 212 indicating that the tags for both the ways 0 and 1 are a cache miss, and outputs the acquired way information 212 to the cache status acquisition unit 400. Then, the cache control unit 210 acquires the LRU 213 indicating the way 0 and outputs it to the cache status acquisition unit 400, upon selection of the way 0 of the tag coming to contain the verification address. Further, the cache control unit 210 reads the data ("A") of the verification address (address 0x1000) from the main memory 300, and by acquiring the data 214 that has been read, outputs the acquired data 214 to the cache status acquisition unit 400.

Then, the output data as a collection of the progress information acquired from the cache control unit 210 is shaped into the same form as the expectation value and output to the verification unit 500 by the cache status acquisition unit 400. Each progress information contained in this output data is verified by the verification unit 500.

Next, the case in which the progress information is verified with the data held in the cache memory 200 is explained with reference to FIG. 8. In the case of FIG. 8, the verification unit 500 has acquired the output data from the cache status acquisition unit 400. The output data acquired by the verification unit 500 is the progress information which is acquired by the stepped operation of the cache control unit 210 with the data held in the cache memory 200 and which is output by the cache status acquisition unit 400 collectively in the same form as the expectation value.

The verification unit 500 compares the output data containing each progress information with the expectation value of a series of the progress information held in advance. Specifically, the verification unit 500 confirms that the progress information "Miss" of the output data coincides with the expectation value with reference to the progress information "Way0=" of the expectation value and the output data, in order to verify whether the tag of way 0 is a cache miss or a cache hit. The verification unit 500 confirms that the progress information "Miss" of the output data coincides with the expectation value with reference to the progress information "Way1=" of the expectation value and the output data, in order to verify whether the tag of the way 1 is a cache miss or a cache hit. Also, the verification unit 500 confirms that the progress information "Way0" of the output data coincides with the expectation value with reference to the progress information "LRU=" of the expectation value and the output data, in order to verify the way of the tag coming to contain the verification address. Further, the verification unit 500 confirms that the progress information "0" of the output data coincides with the expectation value with reference to the progress information "TAG(Way0)=" of the expectation value and the output data, in order to verify whether the tag of way 0 is correct or not. The verification unit 500 confirms that the progress information "0" of the output data coincides with the expectation value with reference to the progress information "TAG(Way1)=" of the expectation value and the output data, in order to verify whether the tag of way 1 is correct or not. Furthermore, the verification unit 500 confirms that the progress information "A" of the output data coincides with the expectation value with reference to the progress information "Data=" of the expectation value and the output data, in order to verify whether the data that has been read is correct or not.

As described above, in the verification unit 500, the progress information acquired by the operation performed in stages can be verified collectively at the time of reading the data, and therefore, the legitimacy of the verification can be efficiently confirmed. Also, in the verification unit 500, the output data as a collection of the progress information can be shaped into the same form as the expectation value by the cache status acquisition unit 400 thereby to improve the verification efficiency further.

Figure 9:
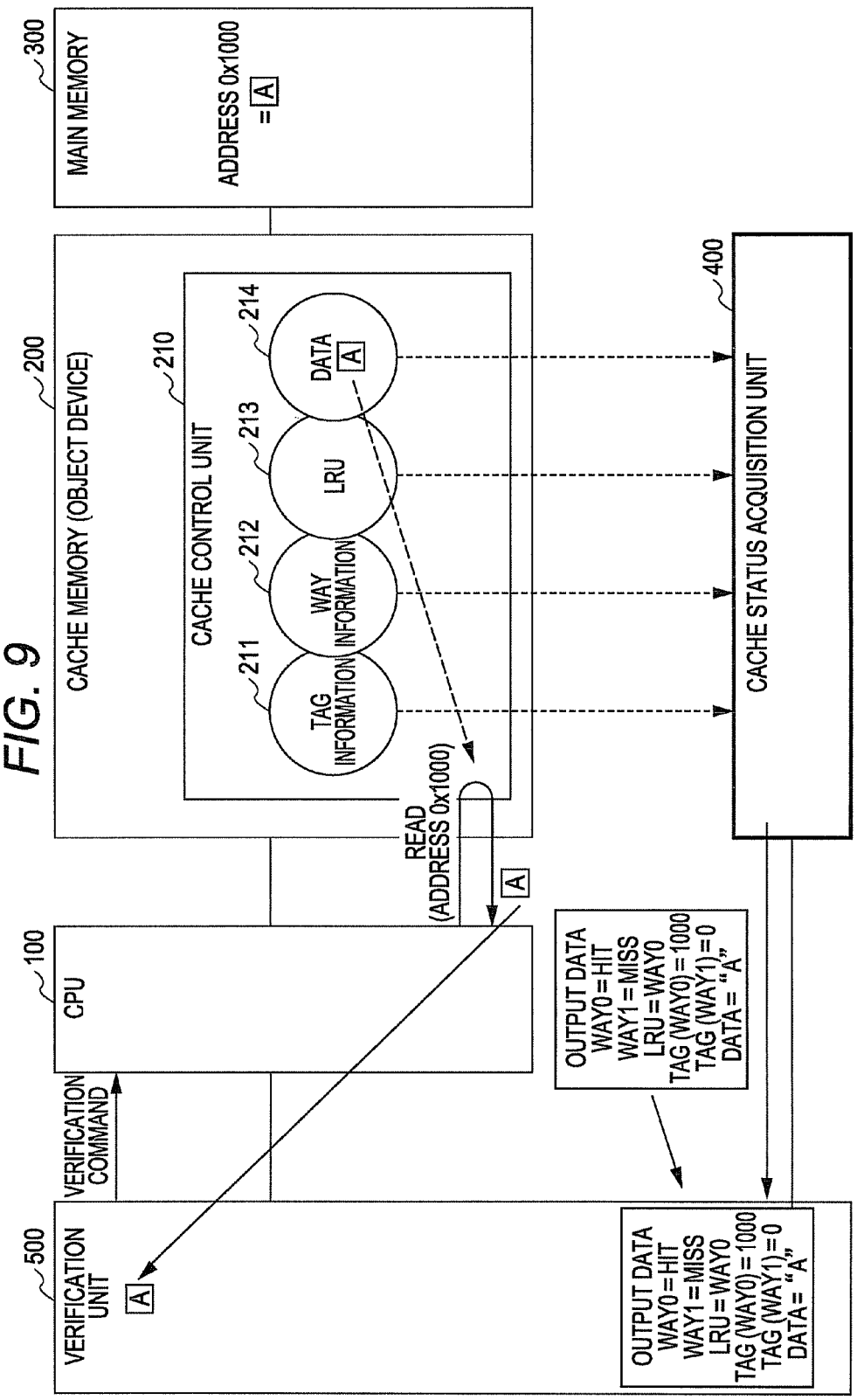
FIG. 9 illustrates an operation for verifying the cache memory according to the first embodiment.
Figure 10:
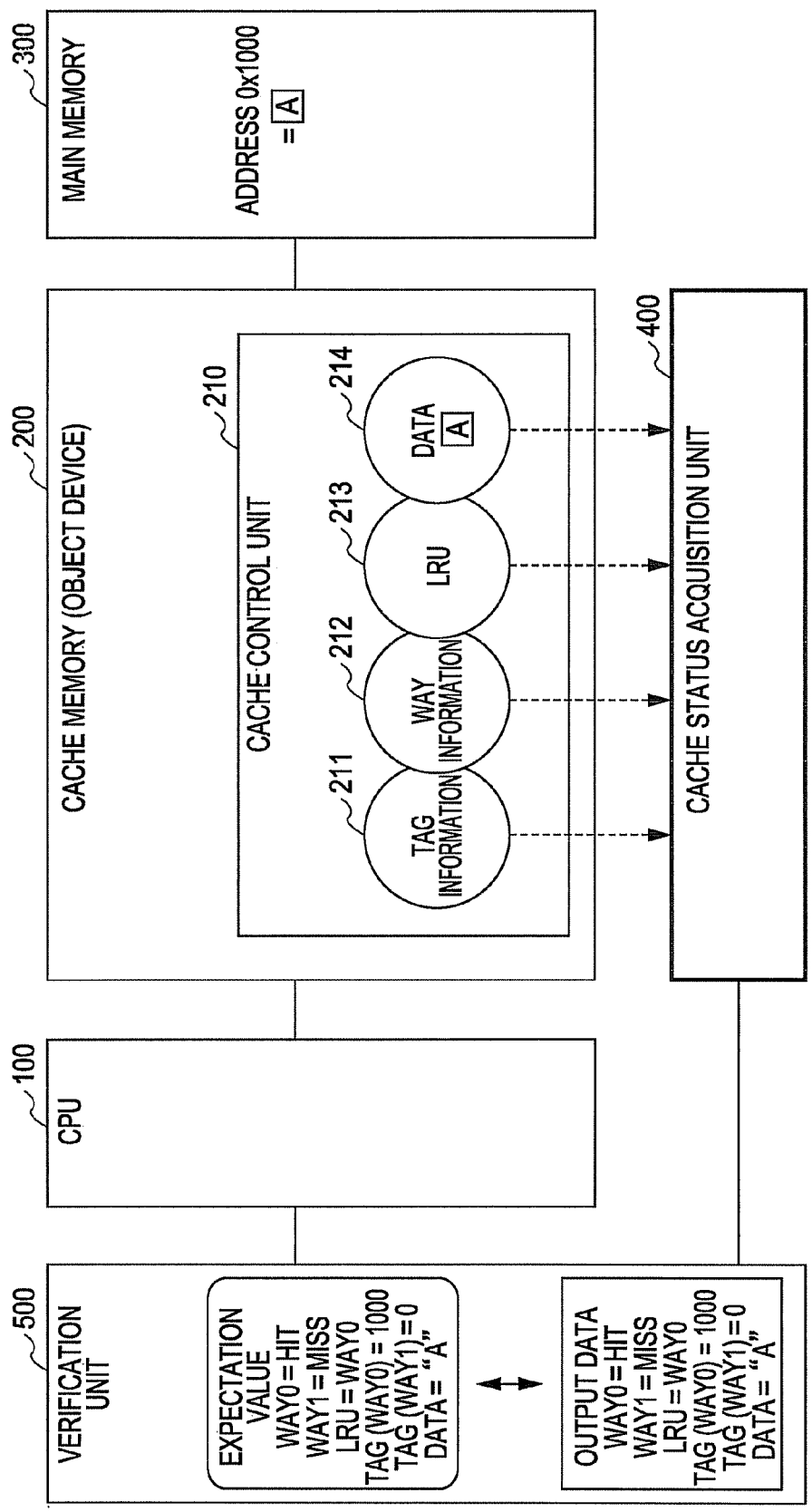
FIG. 10 illustrates an operation for verifying the cache memory according to the first embodiment.

Next, the verify operation to retrieve the data held in the cache memory 200 is explained with reference to FIGS. 9 and 10. The case in which the data held in the cache memory 200 is retrieved is explained with reference to FIG. 9, and the case in which the progress information is verified at the time of retrieving the data held in the cache memory 200 is explained with reference to FIG. 10.

The case in which the data held in the cache memory 200 is retrieved is explained with reference to FIG. 9. As illustrated in FIG. 9, the CPU 100 that has received a verification command from the verification unit 500 outputs a read command to the cache control unit 210 to read the data of the verification address (address 0x1000). In the case of FIG. 9, the data of the verification address of the main memory 300 is held in the cache memory 200, and therefore, the cache control unit 210 reads the data of the verification address from the cache memory 200.

In the process, the progress information acquired by the stepped operation before reading the data from the read command is output by the cache control unit 210 to the cache status acquisition unit 400. Specifically, the cache control unit 210 reads the tag for each way corresponding to the verification address. In the case of FIG. 9, the data of the verification address is held in the cache memory 200, and therefore, assuming that the verification address is contained in the tag of way 0, for example, the cache control unit 210 acquires the tag information 211 indicating "1000" on the tag of way 0 and outputs the acquires tag information 211 to the cache status acquisition unit 400. Also, the cache control unit 210 judges whether the verification address is contained in the tag for each way. In the case of FIG. 9, the tag indicating the verification address is contained in the tag of way 0 corresponding to the verification address, and therefore, the cache control unit 210 acquires the way information 212 indicating that the tag of way 0 is a cache hit and the tag of way 1 is a cache miss, and outputs the acquired way information 212 to the cache status acquisition unit 400. Then, upon selection of the way 0 of the tag containing the verification address, the cache control unit 210 acquires the LRU 213 indicating the way 0, and outputs the acquired LRU 213 to the cache status acquisition unit 400. Further, the cache control unit 210 reads the data ("A") of the verification address (address 0x1000) from the cache memory 200, and by acquiring the data 214 thus read, outputs the data 214 to the cache status acquisition unit 400.

In the cache status acquisition unit 400, the output data as a collection of the progress information acquired from the cache control unit 210 is shaped into the same form as the expectation value and output to the verification unit 500. Each progress information contained in this output data is verified by the verification unit 500.

Next, the case in which the progress information is verified at the time of retrieving the data after being held in the cache memory 200 is explained with reference to FIG. 10. As illustrated in FIG. 10, the verification unit 500 has acquired the output data from the cache status acquisition unit 400. This output data is the progress information acquired by the stepped operation at the time of retrieving the data held in the cache memory 200 by the cache control unit 210 which progress information is output by the cache status acquisition unit 400 collectively and in the same form as the expectation value.

The verification unit 500 compares the output data containing each progress information with the expectation value of a series of the progress information held in advance. Specifically, in order to verify whether the tag of way 0 is a cache miss or a cache hit, the verification unit 500 accesses the progress information "Way0=" of the expectation value and the output data and confirms that the progress information (Hit) of the output data coincides with the expectation value. The verification unit 500 accesses the progress information "Way1=" of the expectation value and the output data, and confirms that the progress information (Miss) of the output data coincides with the expectation value, in order to verify whether the tag of way 1 is a cache miss or a cache hit. Also, the verification unit 500 accesses the progress information "LRU=" of the expectation value and the output data, and confirms that the progress information (Way0) of the output data coincides with the expectation value, in order to verify the way of the tag containing the verification address. Further, the verification unit 500 accesses the progress information "TAG(Way0)=" of the expectation value and the output data, and confirms that the progress information (1000) of the output data coincides with the expectation value, in order to verify whether the tag of way 0 is correct or not. The verification unit 500 accesses the progress information "TAG (Way1)=" of the expectation value and the output data, and confirms that the progress information (0) of the output data coincides with the expectation value, in order to verify whether the tag of way 1 is correct or not. Furthermore, the verification unit 500 accesses the progress information "Data=" of the expectation value and the output data, and confirms that the progress information ("A") of the output data coincides with the expectation value, in order to verify whether the data that has been read is correct or not.

As described above, the verification unit 500 can collectively verify the progress information acquired by the stepped operation at the time of reading the data, and therefore, the legitimacy of the verification can be efficiently confirmed. Also, in the verification unit 500, the output data as a collection of the progress data are shaped into the same form as the expectation value by the cache status acquisition unit 400, and therefore, the verification efficiency is further improved.

As described above, according to this embodiment, the cache logic verification apparatus can directly acquire the ongoing process in each stage of the stepped operation at the time of reading the data from the cache memory 200. As a result, a particular stage which is erroneous can be determined by judging the legitimacy of the ongoing process in each stage. Thus, the logic verification of the cache memory 200 can be efficiently carried out. Consequently, the cache logic verification apparatus can positively verify the legitimacy of each stage thereby to improve the verification quality. Also, in the case where the cache logic verification apparatus collectively acquires the ongoing process from the cache memory in each stage of the stepped operation at the time of reading the data, the ongoing process collectively acquired can be verified at a time, thereby making it possible to reduce the number of steps for verification.

The embodiment explained above represents a case in which the cache status acquisition unit 400 is arranged outside of the cache control unit 210 to acquire the progress information by the stepped operation at the time of reading the data. This invention, however, is not limited to this embodiment, but the cache status acquisition unit 400 may be arranged inside of the cache control unit 210 to acquire the progress information by the stepped operation at the time of reading the data.

Figure 11:
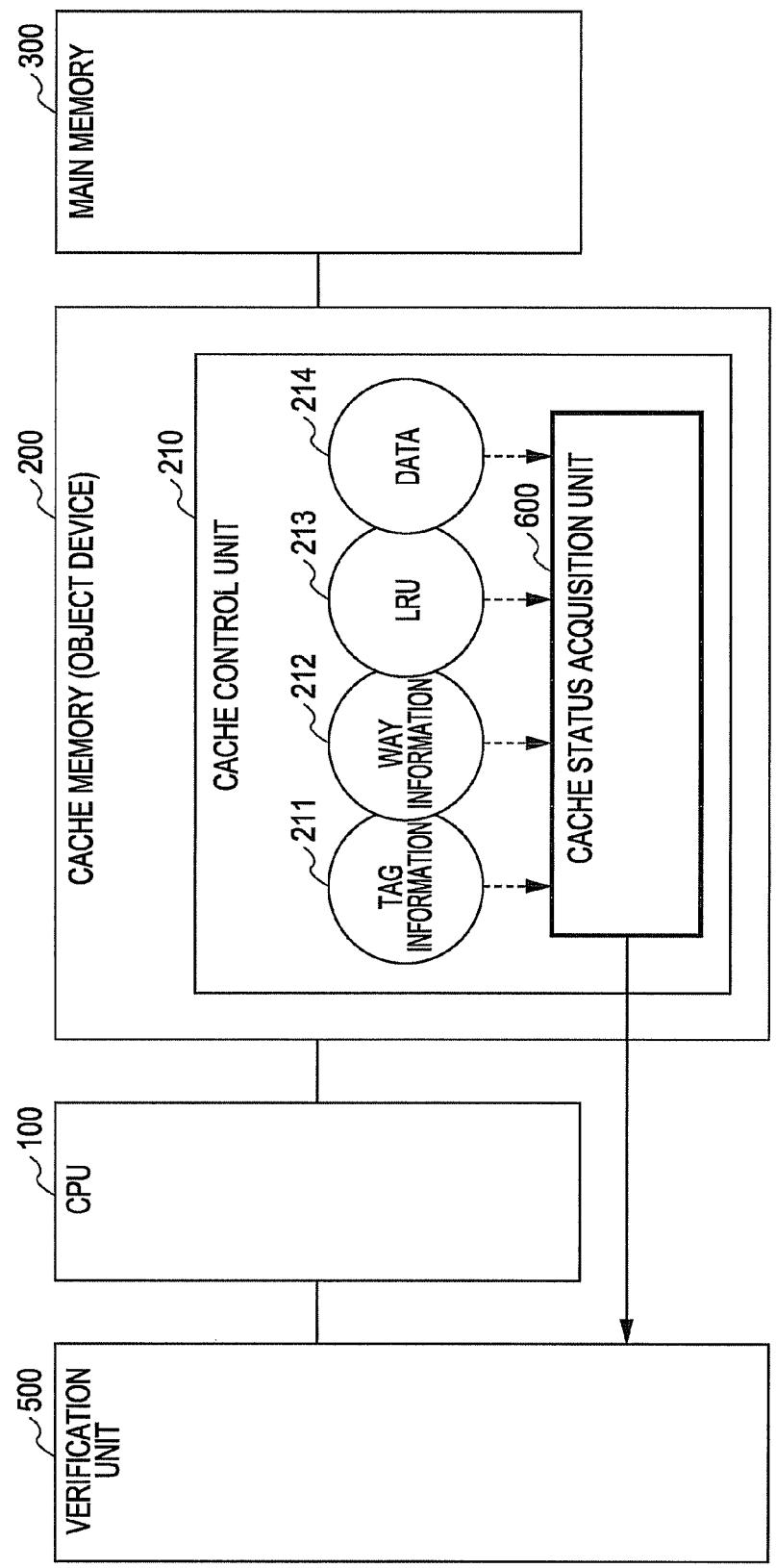
FIG. 11 illustrates an information processing apparatus according to a second embodiment.

In view of this, according to the second embodiment, an explanation is made about a case in which the cache status acquisition unit 400 is arranged inside of the cache control unit 210 to acquire the progress information by the stepped operation at the time of reading the data. The general configuration of the information processing apparatus according to this embodiment is explained with reference to FIG. 11. In FIG. 11, the same component parts as in FIG. 1 are designated by the same reference numerals, respectively, and not described in detail.

As illustrated in FIG. 11, the information processing apparatus includes a CPU 100, a cache memory 200, a main memory 300, a verification unit 500 and a cache status acquisition unit 600.

In the cache status acquisition unit 600 arranged inside of the cache control unit 210, the cache control unit 210 directly acquires the progress information by the stepped operation at the time of reading the data, and outputs it to the verification unit 500. Specifically, the cache status acquisition unit 600 acquires the tag information 211, the way information 212, the LRU 213 and the data 214 output in the order of the operation performed in stages by the cache control unit 210. Also, once a series of the progress information before reading the data corresponding to the verification address is ready, the cache status acquisition unit 600 shapes the series of the progress information into the same form as the expectation value of the series of the progress information held beforehand, and outputs the shaped output data to the verification unit 500. Incidentally, the cache status acquisition unit 400 may acquire the progress information either under the control of the cache control unit 210 based on an independent logic or according to the logic under the control of the cache control unit 210 using, for example, Register Transfer Level (RTL). As a result, in the case where the cache control unit 210 is used with other devices than the cache memory 200, for example, the cache status acquisition unit 600 is not required to be designed for other devices, thereby reducing the design cost of the other devices.

In order to start the logic verification of the cache memory 200, the verification unit 500 outputs a verification command for the cache memory 200 to the CPU 100. Also, the verification unit 500 acquires the data read in response to the verification command from the CPU 100. Further, the verification unit 500 acquires the output data from the cache status acquisition unit 600. Then, the verification unit 500 compares the acquired output data with the expectation value of the output data.

As described above, according to the second embodiment, the cache logic verification apparatus includes the cache status acquisition unit 600 for acquiring the ongoing progress in each stage of the stepped operation to judge whether the data to be read is held in the cache memory 200 holding the copies of the contents of a part of the main memory 300. Also, the cache logic verification apparatus according to the second embodiment includes the verification unit 500 for comparing the ongoing progress in each stage acquired by the cache status acquisition unit 600 with a predetermined expectation value in each step of the stepped operation. Incidentally, the cache status acquisition unit 600 is arranged inside of the cache control unit 210.

For comparative reference, examples of the logic verification of the cache memory in other than the aforementioned embodiments are explained with reference to FIGS. 12, 13, 14 and 15. In the cases of FIGS. 12, 13, 14 and 15, the cache memory for logic verification is connected to the CPU 1 and the main memory, and includes a cache control unit for logically controlling the cache memory.

Figure 12:
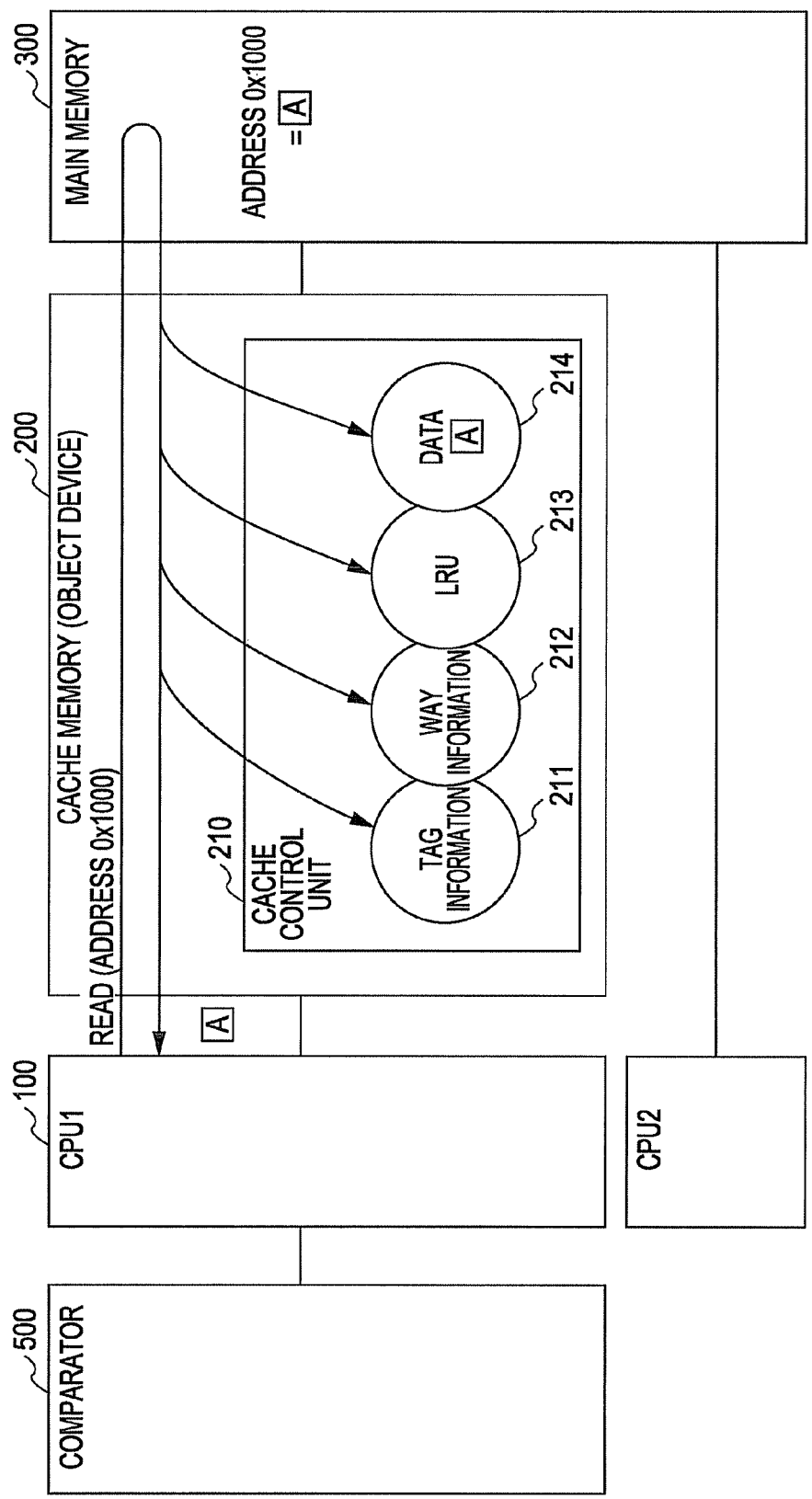
FIG. 12 illustrates cache memory verification operation.

In FIG. 12, in order to make preparation for verification, the CPU 1 reads the data ("A", for example) from the address (verification address) (0x1000, for example) at which the data is stored in the main memory beforehand. As a result, the cache control unit holds the tag indicating the verification address (address 0x1000) in the tag RAM. Also, the cache control unit holds the data ("A") read from the main memory in the data RAM.

Figure 13:
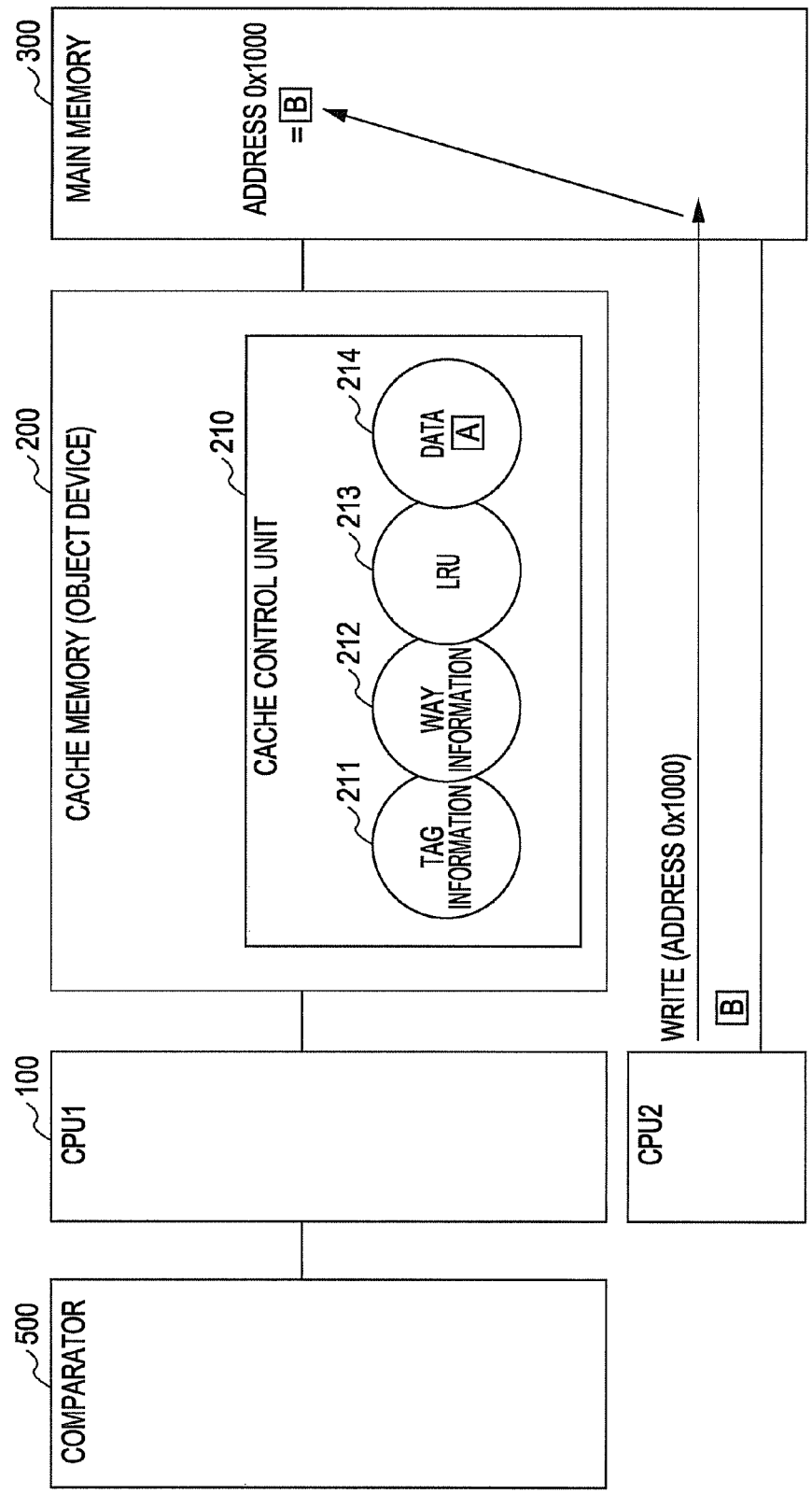
FIG. 13 illustrates cache memory verification operation.

Next, reference is made to FIG. 13. In preparation for the positive verification that the data is read not from the main memory but from the cache memory, the CPU 2 not connected with the cache memory writes, for example, in the verification address (address 0x1000) of the main memory, the data ("B", for example) different from the data ("A") already stored. As a result, the data in the verification address (address 0x1000) stored in the main memory is differentiated by the CPU 2 from the data in the verification address (address 0x1000) held in the cache control unit.

Figure 14:
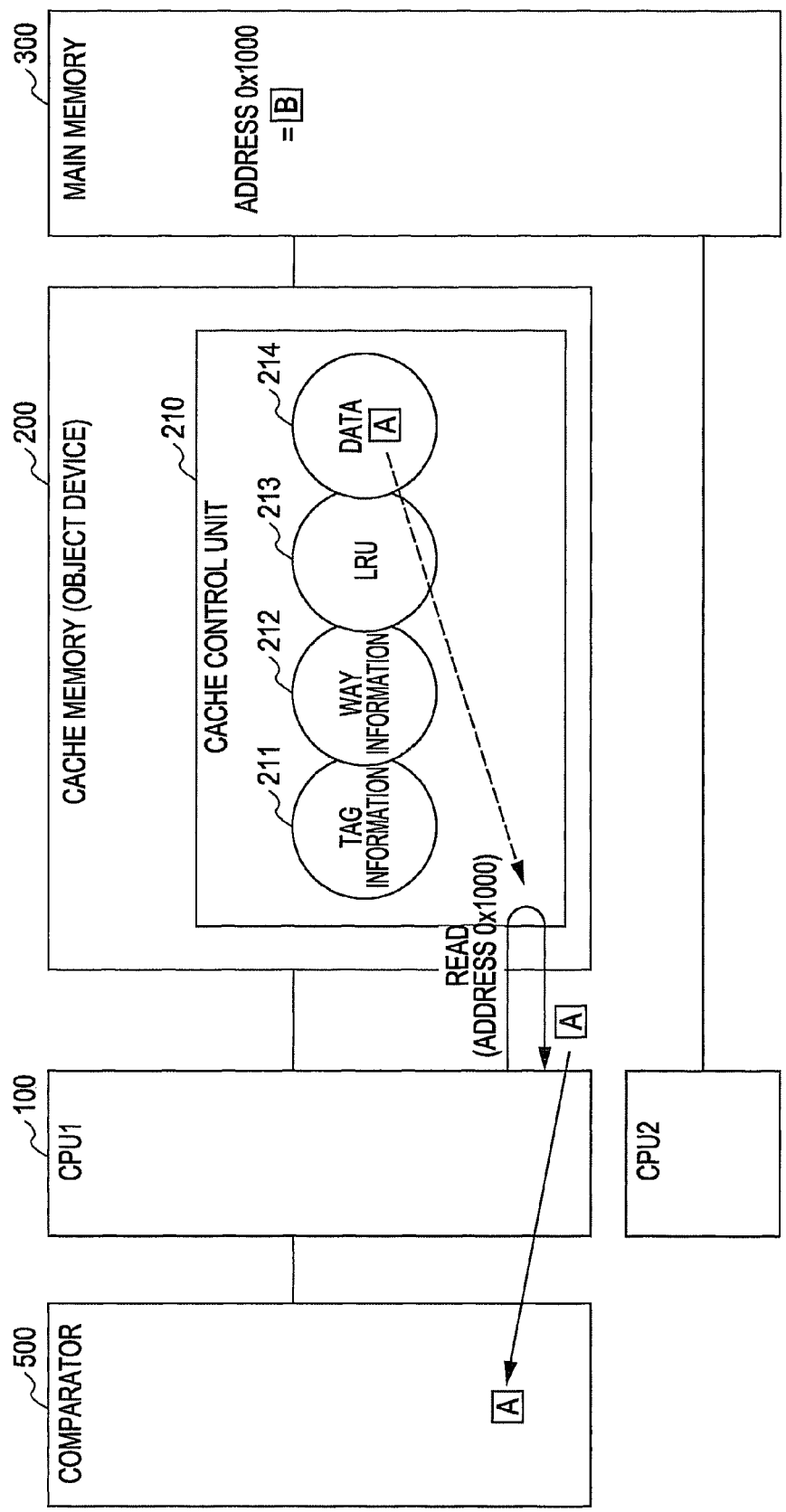
FIG. 14 illustrates cache memory verification.

In FIG. 14, in order to carry out the logic verification of the cache memory after making this preparation, the CPU 1 reads the data again from the verification address (address 0x1000). In the process, the CPU 1 acquires the data ("A") held in the cache memory from the cache control unit, and notifies the acquired data to the comparator.

Figure 15:
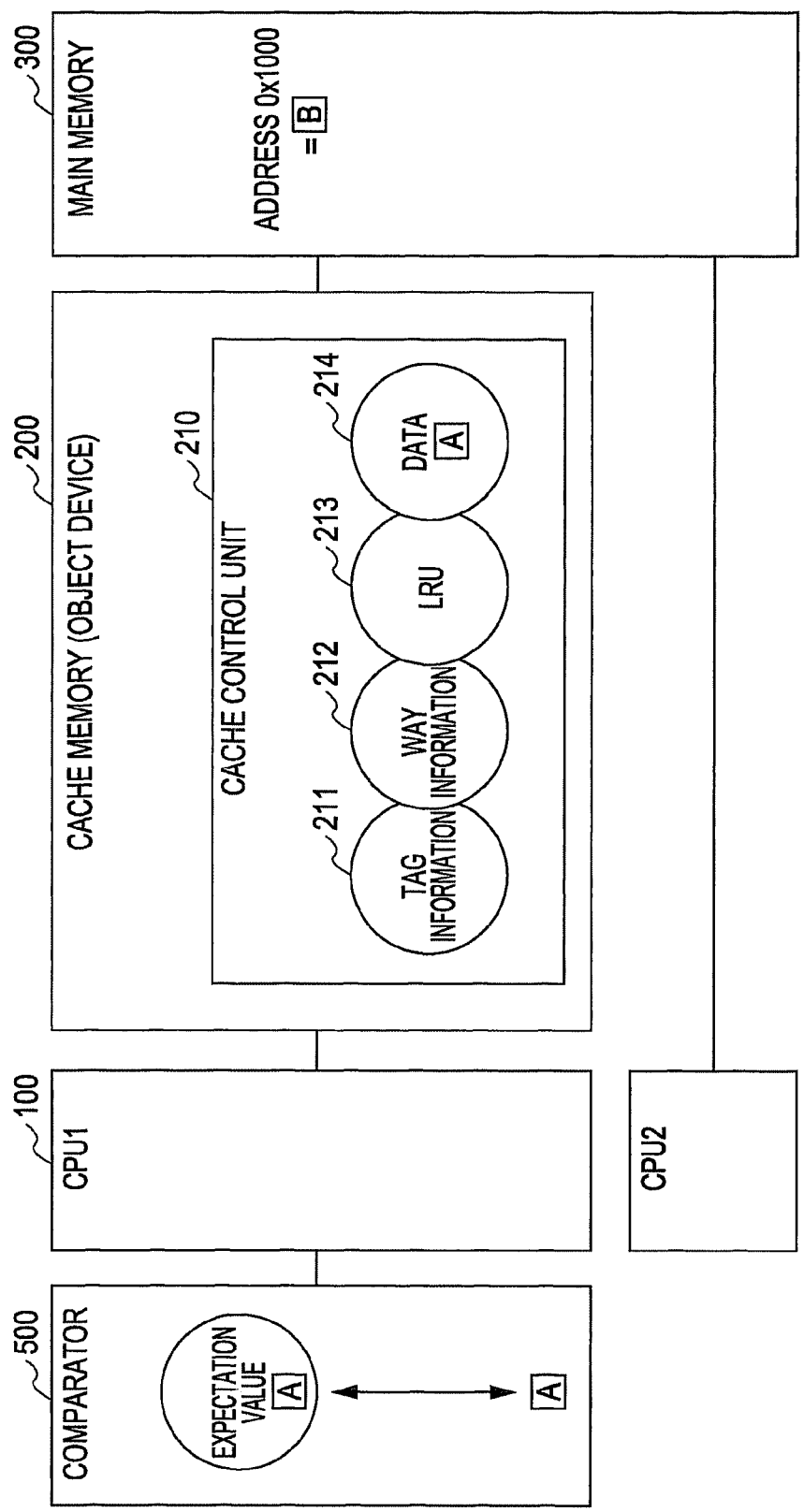
FIG. 15 illustrates cache memory verification.

In FIG. 15, the comparator compares the acquired data ("A") with the expectation value ("A") expected to be acquired at the time of reading the data from the verification address (address 0x1000). In the case where the comparator judges, as the result of comparison, that the acquired data coincides with the expectation value, the logic legitimacy of the operation of the cache control unit is verified. In the case where the comparator judges that the acquired data fails to coincide with the expectation value, on the other hand, the logic error of the operation of the cache control unit is verified.

On the other hand, the cache logic verification apparatus according to this embodiment can directly acquire the ongoing process in each stage of the stepped operation at the time of reading the data from the cache memory 200. As a result, what stage is erroneous is known by judging the legitimacy of the ongoing process in each stage, and therefore, the logic verification of the cache memory 200 can be efficiently carried out. Consequently, the cache logic verification apparatus can positively verify the legitimacy of each stage for an improved verification quality. Also, in the case where the cache logic verification apparatus collectively acquires the ongoing process in each stage of the stepped operation at the time of reading the data from the cache memory, the ongoing process collectively acquired can be verified at a time, thereby reducing the number of verification steps. Also, in the case where the cache control unit 210 is used for other devices than the cache memory 200, the cache status acquisition unit 600 is not required to be designed for the other devices, and therefore, the design cost of other devices can be reduced.

Incidentally, the whole or an arbitrary part of the processing functions of the cache status acquisition units 400, 600 and the verification unit 500 of the cache logic verification apparatus can be realized by the CPU, or the microcomputer such as MPU (micro processing unit or MCU (micro controller unit)) according to the program analyzed and executed by the CPU, or the microcomputer such as the MPU or MCU, as the case may be, or as hardware with the wired logic as desired.

The invention claimed is:

1. A cache logic verification apparatus comprising:
an acquisition unit that acquires data in each stage progressing towards a stepped operation to judge whether data in a cache memory storing a copy of contents of a part of a main memory contains the data in each stage; and
a comparator that compares the data in each stage acquired by the acquisition unit with a predetermined expectation value representing a series of progress information towards the stepped operation, where the data is verified at reading of the data based on a result from the comparator.

2. The cache logic verification apparatus according to claim 1, comprising:
a shaping unit that couples a plurality of data acquired by the acquisition unit, in the same order as a predetermined order of coupling a plurality of predetermined expected values;
wherein the comparator compares the data with the predetermined expected value for each stage of the process.

3. The cache logic verification apparatus according to claim 2, comprising:
an output unit that outputs a particular stage in the case where the comparison by the comparator shows that the data and the predetermined expected value are different from each other in the particular stage.

4. The cache logic verification apparatus according to claim 1, wherein the acquisition unit includes:
a tag information acquisition unit that acquires the tag information which is held in an area of the cache memory corresponding to the address of each of a plurality of data to indicate the address of the data held in the cache memory and which is held in the area corresponding to the address of the data to be read; and
a judgment result acquisition unit that acquires the judgment result indicating whether the tag information corresponding to the address of the data to be read contains the particular address or not.

5. The cache logic verification apparatus according to claim 4, wherein the acquisition unit includes:
a line acquisition unit that acquires a cache line containing the address of the data to be read in the case where the tag information contains a plurality of cache lines each storing the address of the data.

6. The cache logic verification apparatus according to claim 5, wherein the line acquisition unit acquires a cache line that has an access rate of a predetermined value in the absence of the cache line containing the address of the data to be read.

7. The cache logic verification apparatus according to claim 1, comprising:
a control unit that controls the stepped operation for judging whether the data to be read is held in the cache memory storing the copy of the contents of a part of a memory,
wherein the acquisition unit acquires the data in each stage of the stepped operation arranged integrally with the control unit and controlled by the control unit.

8. A cache logic verification method comprising:
acquiring data in each stage progressing towards a stepped operation to judge whether data in a cache memory storing a copy of contents of a part of a main memory contains the data in each stage; and
comparing the acquired data in each stage with a predetermined expectation value representing a series of progress information towards the stepped operation in each stage of the stepped operation, where the data is verified at reading of the data based on a result from the comparing.

9. A cache logic verification program for causing a computer to execute:
acquiring data in each stage of a stepped operation to judge whether data in a cache memory storing a copy of contents of a part of a main memory contains the data in each stage; and
comparing the data in each stage with a predetermined expectation value representing a series of progress information towards the stepped operation in each stage of the stepped operation, where the data is verified at reading of the data based on a result from the comparing.

* * * * *

UNITED STATES PATENT AND TRADEMARK OFFICE
CERTIFICATE OF CORRECTION

PATENT NO. : 8,468,399 B2  
APPLICATION NO. : 12/550741  
DATED : June 18, 2013  
INVENTOR(S) : Eiji Furukawa It is certified that error appears in the above-identified patent and that said Letters Patent is hereby corrected as shown below:

Title Page Col. 1 item (73), (Assignee), Line 1, Delete "Kawakasi (JP)" and insert -- Kawasaki (JP) --, therefor.

Signed and Sealed this  
Eighth Day of October, 2013

Teresa Stanek Rea  
*Deputy Director of the United States Patent and Trademark Office*